(12) United States Patent
Cuthbertson et al.

(10) Patent No.: US 9,828,012 B2
(45) Date of Patent: Nov. 28, 2017

(54) CONDITION MONITORING SYSTEM, CONDITION MONITORING UNIT AND METHOD FOR MONITORING A CONDITION OF A BEARING UNIT FOR A VEHICLE

(71) Applicants: Stephen Cuthbertson, Edinburgh (GB); Julian Franchitti, Erskine (GB); Rashmy Patwari, Edinburgh (GB)

(72) Inventors: Stephen Cuthbertson, Edinburgh (GB); Julian Franchitti, Erskine (GB); Rashmy Patwari, Edinburgh (GB)

(73) Assignee: AKTIEBOLAGET SKF, Gothenburg (SE)

( * ) Notice: Subject to any disclaimer, the term of this patent is extended or adjusted under 35 U.S.C. 154(b) by 73 days.

(21) Appl. No.: 14/946,787

(22) Filed: Nov. 20, 2015

(65) Prior Publication Data
US 2016/0152255 A1  Jun. 2, 2016

(30) Foreign Application Priority Data
Nov. 27, 2014  (GB) .................................. 1421046.2

(51) Int. Cl.
*B61L 25/02* (2006.01)
*G07C 5/08* (2006.01)
(Continued)

(52) U.S. Cl.
CPC ........ *B61L 25/025* (2013.01); *B60B 27/0068* (2013.01); *B61K 9/04* (2013.01); *B61L 15/0027* (2013.01); *B61L 15/0081* (2013.01); *B61L 25/06* (2013.01); *B61L 27/0094* (2013.01); *F16C 19/525* (2013.01); *F16C 19/527* (2013.01); *G01M 13/045* (2013.01); *G01S 19/14* (2013.01); *G07C 5/008* (2013.01); *G07C 5/08* (2013.01);
(Continued)

(58) Field of Classification Search
CPC .... B61L 25/025; B61L 27/0094; B61L 25/06; B61L 15/0081; B61L 15/0027; B61L 2205/04; G01M 13/045; B60B 27/0068; F16C 19/527; F16C 19/525; G07C 5/008; G07C 5/0841; G07C 5/0808; G07C 5/08; B61K 9/04; G01S 19/14
See application file for complete search history.

(56) References Cited

U.S. PATENT DOCUMENTS 6,339,397 B1   1/2002  Baker
7,319,412 B1   1/2008  Copponger et al.
(Continued)

FOREIGN PATENT DOCUMENTS

GB          2335002 A      9/1999
WO   WO 2011029526 A1 *   3/2011    ............ G01M 17/10

*Primary Examiner* — Anne M Antonucci
(74) *Attorney, Agent, or Firm* — Bryan Peckjian; SKF USA Inc. Patent Dept.

(57) ABSTRACT

A condition monitoring system for bearing units for vehicles, the system including at least one condition monitoring unit for measuring at least one operating parameter of one bearing unit and a control unit for receiving and processing signals obtained from the condition monitoring unit. The system additionally includes a circuit for detecting a geographic position, wherein the condition monitoring unit is configured to be at least one of activated and deactivated depending on the detected geographic position.

17 Claims, 3 Drawing Sheets

(51) Int. Cl.

| | |
|---|---|
| *B61L 25/06* | (2006.01) |
| *G07C 5/00* | (2006.01) |
| *G01S 19/14* | (2010.01) |
| *B61K 9/04* | (2006.01) |
| *B61L 15/00* | (2006.01) |
| *B60B 27/00* | (2006.01) |
| *F16C 19/52* | (2006.01) |
| *B61L 27/00* | (2006.01) |
| *G01M 13/04* | (2006.01) |

(52) U.S. Cl.
CPC ......... *G07C 5/0808* (2013.01); *G07C 5/0841* (2013.01); *B61L 2205/04* (2013.01)

(56) References Cited

U.S. PATENT DOCUMENTS

| | | | |
|---|---|---|---|
| 2004/0019577 A1* | 1/2004 | Abdel-Malek | B61K 9/00 |
| 2005/0096020 A1 | 5/2005 | Oesterling et al. | |
| 2007/0152107 A1 | 7/2007 | Lefebvre et al. | |
| 2009/0216398 A1 | 8/2009 | Lynch et al. | |
| 2010/0156712 A1 | 6/2010 | Pisz et al. | |
| 2013/0342362 A1 | 12/2013 | Martin | |
| 2014/0156123 A1 | 6/2014 | Cooper et al. | |
| 2016/0103083 A1* | 4/2016 | Bartonek | B61K 9/04 |
| | | | 701/19 |

* cited by examiner

CONDITION MONITORING SYSTEM, CONDITION MONITORING UNIT AND METHOD FOR MONITORING A CONDITION OF A BEARING UNIT FOR A VEHICLE

CROSS REFERENCE TO RELATED APPLICATIONS

This is a Non-Provisional Patent Application, filed under the Paris Convention, claiming the benefit of Great Britain (GB) Patent Application Number 1421046.2, filed on 27 Nov. 2014 (27.11.2014), which is incorporated herein by reference in its entirety.

FIELD OF THE INVENTION

The invention relates to condition monitoring systems used in vehicles to monitor axles or bearing units, to condition monitoring units for use in such systems and to a method for monitoring a condition of a bearing or an axle. In particular, the invention relates to monitoring systems for train axles and/or bearings.

BACKGROUND OF THE INVENTION

It is known to attach condition monitoring units to a train axle or to a bearing thereof in order to monitor parameters such as vibration, temperature and acoustic emission.

Within the automotive sector there are a plethora of wired sensors, many of which are associated with ECU (Engine Control Unit) and OBD (On Board Diagnostic) systems. These sensors are fully integrated into the vehicles infrastructure such that during the vehicles operation they have a continuous power supply. Data communications are supported by a CAN (Controller Area Network) bus. These sensor systems operate continuously to monitor their target parameters.

Locomotives and passenger carriages also have a range of sensor systems that are fully integrated, but these are generally related to safety critical functionality. However, some rail carriages, particularly those associated with freight, have no integrated sensor systems or infrastructure that could support them.

The use of wireless sensor systems on vehicles has been steadily increasing over recent times. With the advent of wireless sensor systems it is now possible to monitor the operation of more components of rotating machinery than ever before, including component areas previously considered inaccessible. Their application is often associated with rotational components such as drive shafts and bearings.

Many of these applications require wireless sensors to be located where it is impractical to have a wired power supply. While there are a number of mechanisms which can be employed to facilitate power harvesting at the site of wireless sensors, they are often not practical for a given situation and normally still have a reliance on energy storage devices such as batteries. A consideration in the design of wireless sensor systems is the time between maintenance which is frequently dictated by the life of their batteries. As a consequence, power management is an important factor in the design of wireless sensor systems because it has immediate impact on maintenance intervals.

Currently available condition monitoring solutions with permanent power sources are configured capture data continuously. However the captured data generally contain a large volume of artifacts and the measured curves reflect the curviness of the track, imperfections of the rails and other external influences. It is therefore necessary to use complex algorithms to filter the data to eliminate artifacts and to extract valuable and reliable information on the condition of the bearing from the large volume of data.

A further issue relates to power usage of the sensors included in the condition monitoring unit. Currently, the sensor is battery powered and longevity of the battery is dependent upon the time which the sensor is spent active. The problem of limited longevity of the battery has been addressed in the prior art by replacing the battery with generator means integrated in the axle box have developed a generator integrated in the axle box to meet the increasing demands of rail transportation. This problem is of particular relevance in systems wherein electronic data transmission systems where data transmission is required in shorter intervals, where high volumes of data are to be transmitted or where active sensors requiring power supply are used.

No focus has yet been placed on power saving and a technical prejudice against the idea of power saving exists because the systems are generally considered to be safety systems.

Satellite based positioning systems such as GPS navigation systems have become popular, particularly in motor vehicles. There is now a readily available range of low cost GPS devices and chipsets available. As a consequence, many automotive manufacturers have considered exploiting the technology to provide additional features for their customers. The offerings are wide and varied, ranging from the basic provision of location information through to notifying emergency services of the location and vehicle status after an accident. A popular opportunity with automotive manufacturers is associated with the provision of vehicle diagnostic information when a car goes in for a service or repair.

Systems are now being considered that will identify the nearest dealership/garage, retrieve diagnostic codes from the vehicles OBD system and send the data via mobile telephony to the garage. One example of such a system is disclosed in U.S. Pat. No. 7,142,959 B2. GPS systems are not so common with rail vehicles for some obvious reasons, but asset tracking systems based on this technology are available as disclosed e.g. in U.S. Pat. No. 6,339,397 B1.

Those automotive uses for GPS systems associated with operational/diagnostic data are primarily associated with determination of nearest appropriate facilities, or the provision of vehicle location information to enable a more centralized system to determine such.

It has further been suggested to set geo-boundaries, or GPS gates in order to provide for triggering mechanisms based on geographic locations. Examples for systems of this kind are disclosed in U.S. Pat. No. 7,319,412 B1, US2010/0156712A1. These types of systems are primarily intended for use in security related offerings, be it offender tracking or identification of the unauthorized movement of a vehicle. While these systems offer potential triggering mechanisms based on geographic location, they are used primarily to initiate messaging systems to provide limited information to higher level systems. Even when considering vehicle diagnostic information, the systems simply pass codes from an OBD system.

SUMMARY OF THE INVENTION

The invention seeks to overcome the above problems of the prior art by providing a condition monitoring system with long service life and reduced complexity in terms of data processing.

A first aspect of the invention relates to a condition monitoring system for bearing units for vehicles, the system comprising at least one condition monitoring unit for measuring at least one operating parameter of one bearing unit and a control unit for receiving and processing signals obtained from the condition monitoring unit.

It is proposed that the system further comprises means for detecting a geographic position of the vehicle or of the condition monitoring unit, wherein the condition monitoring unit is configured to be activated and/or deactivated depending on the detected geographic position.

The possibility to trigger the monitoring as a function of the geographic position has the advantage that the capturing of data can be restricted to parts of the track or of the route of the vehicle where reliable data acquisition is expected. This solution can repeatedly identify when and where to trigger the data recording.

The invention greatly simplifies the power management by enabling a reliable triggering in order to operate the system on an intermittent basis instead of continuous operation. It is not only the determination but also the implementation of optimal operating periods to fulfill an intermittent operational strategy that can provide challenges. Triggering the system to begin a period of operation can be difficult to achieve while minimizing power consumption using a simple time trigger is inadequate.

Given the need to minimize power consumption, the invention enables making the sensor systems only be operational when their monitoring of components is essential or will yield the most effective results. When the machinery being monitored is part of a mobile system such as a train, then additional external factors need to be considered. The nature of these external factors is varied and their relevance is often associated with the parameters of interest for the wireless sensor system. For example, if a sensor system is monitoring a wheel bearing on a train, the nature of the track it is running on is highly relevant. Wheel bearings are likely to be at their maximum and minimum loading on curved sections of track, while sets of points will impact on the sensor data.

The nature of the parameters being monitored often dictates the approach being adopted. Termination of an operating period is also worthy of similar consideration. In addition, when dealing with mobile systems such as vehicles there may be a need for data from the wireless sensor systems to be transmitted to an external system. When short range RF communications are employed and the external system is a fixed installation it may be appropriate to apply consideration to triggering communication systems based on geographic location, i.e. only when the external system is within the communication range.

When monitoring rotating machinery, it is often useful to be able to gather sensor data during steady state operations and minimize noise from unwanted sources. If we consider the example of a wireless sensor system for monitoring wheel bearings on a train, this would equate to running at constant speed within a determined speed band on a straight length of track in good condition. In this simple example let us consider that the train has a fixed route and that once each day it passes along a straight length of track at a constant speed for a set distance. Immediately before and after this section of track the route follows a more meandering path and passes over numerous sets of points that would result in a severe reduction in the quality of data being collected over these parts of the route. It is also highly desirable in this instance to collect data for exactly the same section of track each day, to enable like for like comparisons within the data.

Prior to reaching this section of track the sensor system is 'asleep' to save power, but it is required to be fully operational and gathering data for a set time or set distance over the track. All these objects can be easily achieved by the invention.

In the case of a train travelling the same route every day, it would be possible to simply use a clock as the basis for a 'wake-up' call at the same time every day and operate for a fixed period of time. However, even the most punctual of railway systems can suffer unexpected delays which would be difficult to account for using this method. As a result, it is highly likely that variation of the location of initiation of the sensing operation would result in the collected data being of low quality and potentially associated with different operating conditions. The primary requirement in this instance to ensure consistency is a triggering system based on location.

There are trackside systems both for tracking train movements and also associated with Hotbox detection that could potentially be used as positional markers. Unfortunately, these trackside installations can be some distance from the section of track intended to be used for monitoring and can be placed at different sides of the track at different locations. There is also the difficulty of being able to identify these trackside installations without either installing additional equipment for the monitoring operation or integrating additional equipment into the trackside facilities. Neither of these options is desirable.

However, associating a GPS navigation system with the monitoring system provides the basis for a triggering system based on geographical locations without the need for infrastructure. Such a mechanism enables the wireless sensor system to monitor parameters of interest over the same section of track on every occasion the train passes over it, irrespective of the time of day or frequency it passes over this section of track.

The invention combines the functionality of GPS systems with wireless sensor system in order to optimally control intermittent monitoring operations for vehicles and other mobile machinery. This offers a departure from its standard uses where sensor operations are continuous. Consequently, a method has been developed that uses GPS location information as the trigger for initiation and termination of wireless sensor operations.

In applications where the invention is applied to track based or road based vehicles, complex geo-boundaries/gates are not required, instead waypoints can be used as the basis for triggering a range of operations of the wireless sensor system. Waypoints could be entered manually, either locally or remotely to the system.

Alternatively, a GPS based triggering system equipped with map data and details of the vehicle route could identify potential waypoints from a specification of the monitoring to be conducted.

This approach entails a comparison of the user requirements alongside a map of the route. More advanced systems based on similar principals could also be developed whereby the GPS system input is used to generate a detailed mapping of the route prior to being used for control of the sensor system. This latter approach would be able to create a route map with greater detail than is found with generalized map data alone and could be beneficial in discovering useful features of the route. At the simplest level this could help inform the user that specific sections of track were too noisy, or operation of the train too erratic to consider using the wireless sensor systems on, alternatively, it could be used to identify specific conditions during which monitoring by the wireless sensors would be useful.

To ensure consistent and reliable data readings, the condition monitoring unit should capture data on a known good quality section of track. Preferably, the track or route should be straight, level and allow the train to reach and maintain a constant speed. Additionally these track trigger co-ordinates function as reference points for data trending as all measurements will therefore be referenced to the same points on the track or route.

The system can be applied to any kind of vehicle including in particular trains and trucks.

Energy consumption can be reduced significantly by powering on and logging data for short periods of time when the correct conditions are met. Triggering measurements on a known piece of track reduces data collection errors or anomalies and optimizes the power usage. The reduced energy consumption may enable using generators or power harvesting means with lower rated power or increasing the longevity of batteries.

According to a further aspect of the invention, it is proposed that the control unit is equipped with a memory for storing route data of the vehicle, the route data including a plurality of possible route sections along which the vehicle can travel, wherein the control unit is configured to activate the condition monitoring unit when the vehicle is travelling in one route section out of a predetermined set of route sections and to deactivate the condition monitoring unit in route sections not included in the predetermined set of route sections. The predetermined set of route or track sections can be selected such that high quality data may be expected as indicated above.

In a further embodiment of the invention, the control unit is equipped with a memory for storing route data of the vehicle, the route data including a plurality of possible route sections along which the vehicle can travel, wherein the control unit is configured to evaluate at least one characteristic of the route sections of the route data and to activate the condition monitoring unit when the vehicle is travelling in a route section with characteristics meeting at least one predetermined criterion and to deactivate the condition monitoring unit in route sections not meeting the at least one predetermined criterion. The control unit can automatically evaluate parameters of the next section of the route or the track and activate the condition monitoring unit if the criteria are met. Parameters may include but are not limited to the slope, curvature or curviness and the number of expected stops and starts of the vehicle.

In a preferred embodiment of the invention, the means for detecting the geographic position includes means for receiving signals of satellites of a global positioning system (GPS). It is considered that GPS offers the most appropriate enabling mechanism to fulfill the requirements of the system according to the invention.

The GPS system, incorporated in the system's control unit located on the train or the truck, can accurately monitor and confirm the train's position and speed. Long and straight sections of track, suitable for capturing data on can be identified and the coordinates programmed into the control unit. When arriving at these coordinates, the central control unit can issue a command to wake the condition monitoring units from sleep mode, relay the appropriate train speed and trigger data measurements. If the correct GPS and/or speed conditions are not met, no data recording is performed thus saving energy.

Automatic "wake up", start of data recording and return to "sleep mode" of the condition monitoring unit triggered by GPS position in conjunction with rail network mapping is a very efficient way to reduce energy consumption and computational complexity of the data processing as described above.

A further aspect of the invention relates to a condition monitoring system as described above, wherein the condition monitoring unit includes a battery as an energy supply. The invention is particularly beneficial in this case. The battery life can be prolonged significantly by powering on and logging data for short periods of time when the correct conditions are met. Triggering measurements on a known piece of track reduces data collection errors or anomalies and optimizes the power usage of the battery.

According to a further aspect of the invention, it is proposed that the condition monitoring unit is configured to communicate with the control unit in a wireless way. The problem of energy supply is obviously less virulent in the case of wire-bound systems.

In a preferred embodiment of the invention, it is proposed that the means for detecting a geographic position is part of the control unit of the vehicle located centrally, e.g. in a locomotive of the train or in a cabin of a truck. Existing GPS receivers in vehicle control systems can be used.

As an alternative embodiment of the invention, it is proposed that the means for detecting a geographic position is part of the condition monitoring unit attached to the bearing unit. The means for detecting a geographic position could be a simple GPS receiver as known form mobile phone technology, which will be sufficiently small to be integrated into the condition monitoring unit in/on the axle box.

In a preferred embodiment of the invention, the condition monitoring unit is configured to be attached to a hub unit of a train, wherein the control unit is configured to monitor the condition of a plurality of hub units of the train.

A further aspect of the invention relates to a condition monitoring unit for use in a condition monitoring system as described above, wherein the condition monitoring unit includes a controller configured to operate in an energy saving sleep mode and in an active mode, wherein at least some of the parameters being monitored in the active mode are not monitored in the sleep mode, wherein the controller is configured to switch the condition monitoring unit from the sleep mode to the active mode and from the active mode into the sleep mode based on signals received by the controller.

Further, it is proposed that the controller is configured to switch the condition monitoring unit from the sleep mode to the active mode upon receipt of a wake-up signal from a control unit of a vehicle in which the condition monitoring operates and to switch the condition monitoring nit from the active mode into the sleep mode upon receipt of a sleep signal from the control unit.

A further aspect of the invention relates to a method for monitoring a condition of a bearing unit for a vehicle using at least one condition monitoring unit for measuring at least one operating parameter of one bearing unit and a control unit for receiving and processing signals obtained from the condition monitoring unit.

Further, it is proposed that a geographic position of the vehicle is detected and in that the condition monitoring unit activated and/or deactivated depending on the detected geographic position.

The invention enables selective data acquisition wherein data is only captured at known good sections of track. The benefits of this include the following:

Data measurements are all referenced to the same point of track so each measurement is comparable against the last allowing for easier analysis and data trending.

Battery life is increased as the sensor is only active for short periods of time when the correct conditions are met.

Low cost solution, requiring only and external GPS antenna and GPS module in a PC.

A further aspect of the invention relates to a method of triggering simultaneous measurements across multiple nodes at a given geographical location. The influence that track conditions may have on the measurements collected by the sensors may be discounted then. This helps ensuring that measurement quality remains consistent across all sensors. GPS coupled with a time synchronized sensor network can also be used to provide such a feature.

A further aspect of the invention relates to the use of the system as specified above for the purpose of measuring track quality as a tool for infrastructure monitoring. Since the wireless sensors are configured to capture bursts of acoustic emission and vibration at specific locations, they could also be used to capture characteristics of the track condition at specific track segments. In cases where a rail operator suspects that a given section of track may be damaged and in turn may be causing passenger discomfort or damage to rolling stock, the system may be configured to capture data at these specific segments in order for the rail operator to trend degradation or ascertain if the track segment is in fact damaged.

The following non-limiting description of embodiments of the invention as well as the appended claims and figures show multiple characterizing features of the invention in specific combinations. The skilled person will easily be able to consider further combinations or sub-combinations of these features in order to adapt the invention as defined in the claims to his or her specific needs

DETAILED DESCRIPTION OF THE EMBODIMENTS

Figure 1:
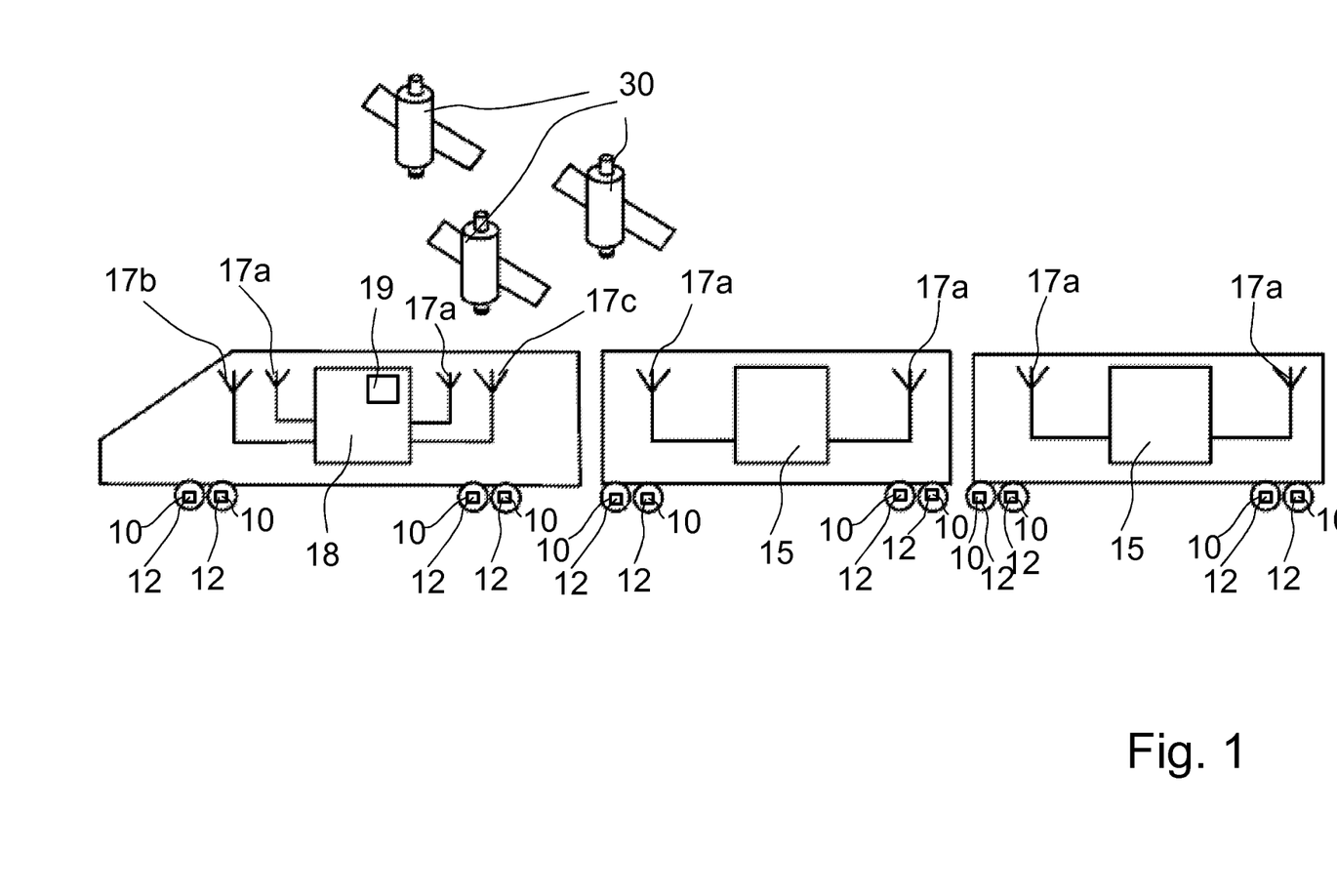
FIG. 1 is a schematic representation of a train including a condition monitoring system for bearing units for vehicles according to the invention.

FIG. 1 is a schematic representation of a train including a condition monitoring system for bearing units for vehicles according to the invention. The system comprises multiple condition monitoring units 10—one for each wheel of the train—for measuring at least one operating parameter of one bearing unit of a train axle box. The condition monitoring units 10 are formed as wireless sensor nodes attached to or embedded into the end plate of a double row roller bearing assembly of the hub (not shown). The measured operating parameters include vibrations, acoustic emissions and temperature of the bearing and the condition monitoring units 10 include corresponding sensors 12 respectively.

A system concentrator serving as a control unit 18 for receiving and processing signals obtained from the condition monitoring unit 10 is provided in a locomotive of the train.

The control unit 18 is essentially a personal computer equipped with software for controlling and monitoring various mechanical devices of the train and for issuing warning signals in cases where damages are detected or likely to occur based on the signals received from the condition monitoring units 10.

The communication between the control unit 18 and the condition monitoring units 10 is at least partially wireless using antennae 17a. If necessary, each of the wagons is provided or some of the wagons are provided with a remote network manager 15 serving as a wireless network manager, a power supply manager for the units 10 and as a wireless network extender. The wireless network can be a single-band 2.4 GHz network or a dual band 2.4 GHz and 5 GhHz network. The skilled person may use other communication frequencies or protocols including different protocols for the backbone and for the communication between extenders and the units 10 depending on the circumstances.

The control unit 18 is further equipped with a GPS antenna 17c and with an antenna 17b for a mobile communication interface using e.g. a GSM, GPRS, UMTS, LTE or HSDPA standard.

In the embodiment of FIG. 1, the control unit 18 comprises a GPS receiver 19 receiving positioning signals from a system of satellites 30 as means for detecting a geographic position. The system is configured such that the condition monitoring units 10 are activated and/or deactivated depending on the detected geographic position as further explained below.

Figure 2:
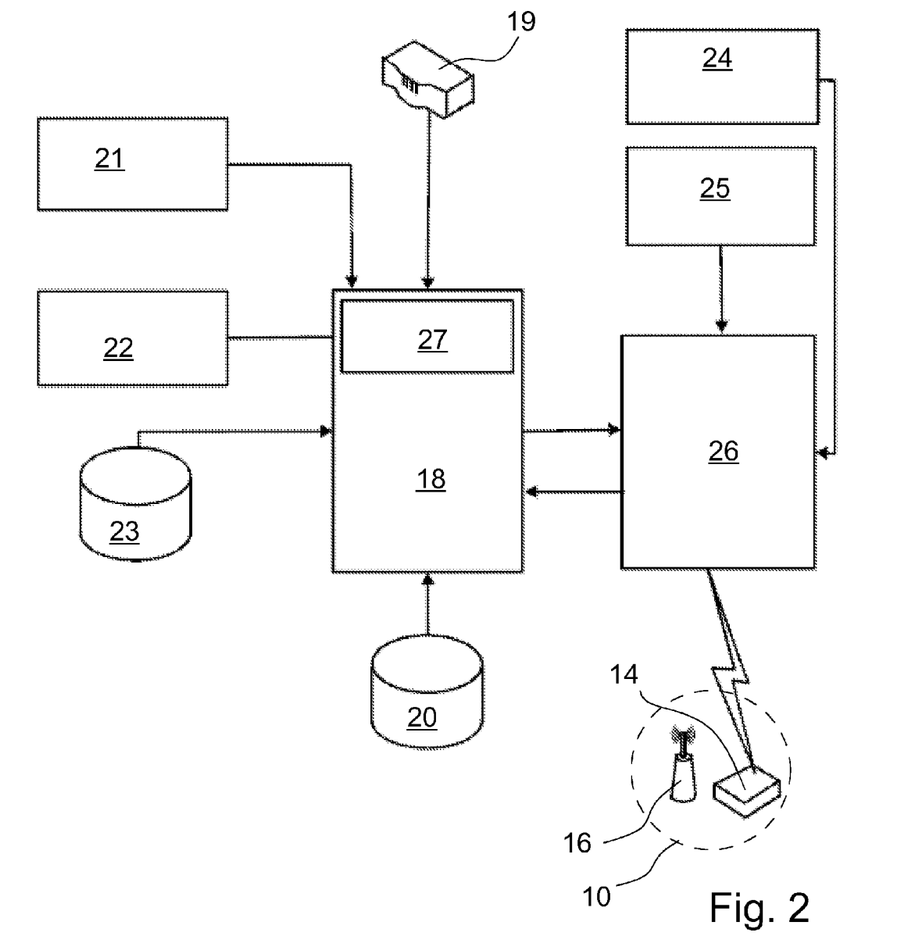
FIG. 2 is system component diagram of the monitoring system according to the invention is illustrated.

A system component diagram of the monitoring system according to the invention is illustrated in FIG. 2.

The condition monitoring units 10 are provided with a controller 14 and a transmitter 16 for wireless communication and with batteries powering the sensors, the controller 14 and the transmitter 16.

The control unit 18 is equipped with a memory 20 for storing route data of the vehicle as well as other data including sensor data captured by the sensors 12. In the embodiment were the vehicle is a train, the route data is a map of a railway network. In other embodiments, the route data may be a collection or a database of waypoints. The railway network is composed of a plurality of sections or links stored in the database in the memory 20 in combination with parameters describing properties of the section such as a slope, average curvature, and maximum allowable travelling speed. The database in the memory 20 includes a plurality of possible route sections along which the vehicle can travel.

A trigger planner 22 is configured to set trigger points for activating the condition monitoring units 10 with the sensors 12 in suitable sections of the track. Deactivation trigger points can be set by the trigger planner 22 as well. In an alternative embodiment, the condition monitoring units 10 can be deactivated when a predetermined time has elapsed. The trigger planner 22 can be part of the control unit 18 or of a remote server sending the trigger points to the control unit 18 using the mobile communication interface.

Each of the trigger points is a data structure comprising not only the GPS coordinates but a further optional field indicating the travelling direction of the train in which the monitoring shall be triggered. Further, the data structure may comprise fields for upper and lower speed limits and, in one embodiment of the invention, for a radius, i.e. a minimum distance to the GPS coordinates required to trigger the waypoint alarm. Accordingly, the system can be configured such that the alarm is not triggered every time the train passes the waypoint but rather when the train passes in one of the two possible directions on a track and when the speed is in a desired range suitable for obtaining measurements of high quality.

In the embodiment of the figures, the trigger planner 22 is a GUI Application for planning the data collection waypoints on the train's route. These may in particular include actual co-ordinates on a straight path where the speed is known to be constant. The trigger planner 22 in the embodiment provides a KML (Keyhole Markup Language) file or other kind of standard file format (e.g. GML) which is a standard for GIS data used by various map providers. This generic file can be used by a server of the condition monitoring system to download and use the waypoints or trigger points, which are stored in a trigger plan database 23.

The trigger points are starting points of route sections which are part of a set of predetermined route sections in which the data acquisition by the condition monitoring units 10 shall be activated.

The control unit 18 is configured to activate the condition monitoring unit 10 by sending a wakeup signal when the train passes a trigger point, i.e. enters a new route section included in the predetermined set of route sections. When the train passes a deactivating trigger point, i.e. leaves the route section for which the measurement shall be performed, the control unit 18 deactivates the condition monitoring units 10 by sending a sleep signal.

After completion of the measurement, the measured data are stored in the memory 20 and sent to a remote condition monitoring server using the mobile communication interface of the control unit 18.

In a preferred embodiment of the invention, the GPS module 27 is implemented as a library or a GPS processing thread in the control unit 18. It will have the required functionality of GIS Data acquisition from the Global Navigation Satellite System (GNSS) receiver 19. A thread in the control unit 18 loads the software module and starts GPS message interpretation. This thread is managed by the option setup in the server manager of the control unit 18. If the GPS option is selected and the appropriate KML data is loaded, the thread starts.

On start, the GPS module 27 automatically connects to the GPS devices and detects connected emulators. Then, the GPS system listens and interprets messages for Position, Speed, and Direction encoded according to the standards set by the national marine electronics association (NMEA). Then, the in-memory trigger plan database 23 with the collection of waypoints in the memory 20 is updated using the data received from the trigger planner 22. Based on the position, the GPS system determines a waypoint arrival for each of the provided waypoints and notifies the clients when the waypoint is reached.

The system further comprises a server manager application 21 providing configuration data, a collector application 24 for triggering measurements manually, a device manager application 25 for managing the settings of the units 10 on the wheels and a communication service 26.

Optionally, the GPS system watches for speed changes beyond tolerance limits (if provided) and notifies changes. To this end, the NMEA messages are repeatedly received and processed until a Stop message is received. On Stop, the necessary clean-up is performed.

Figure 3:
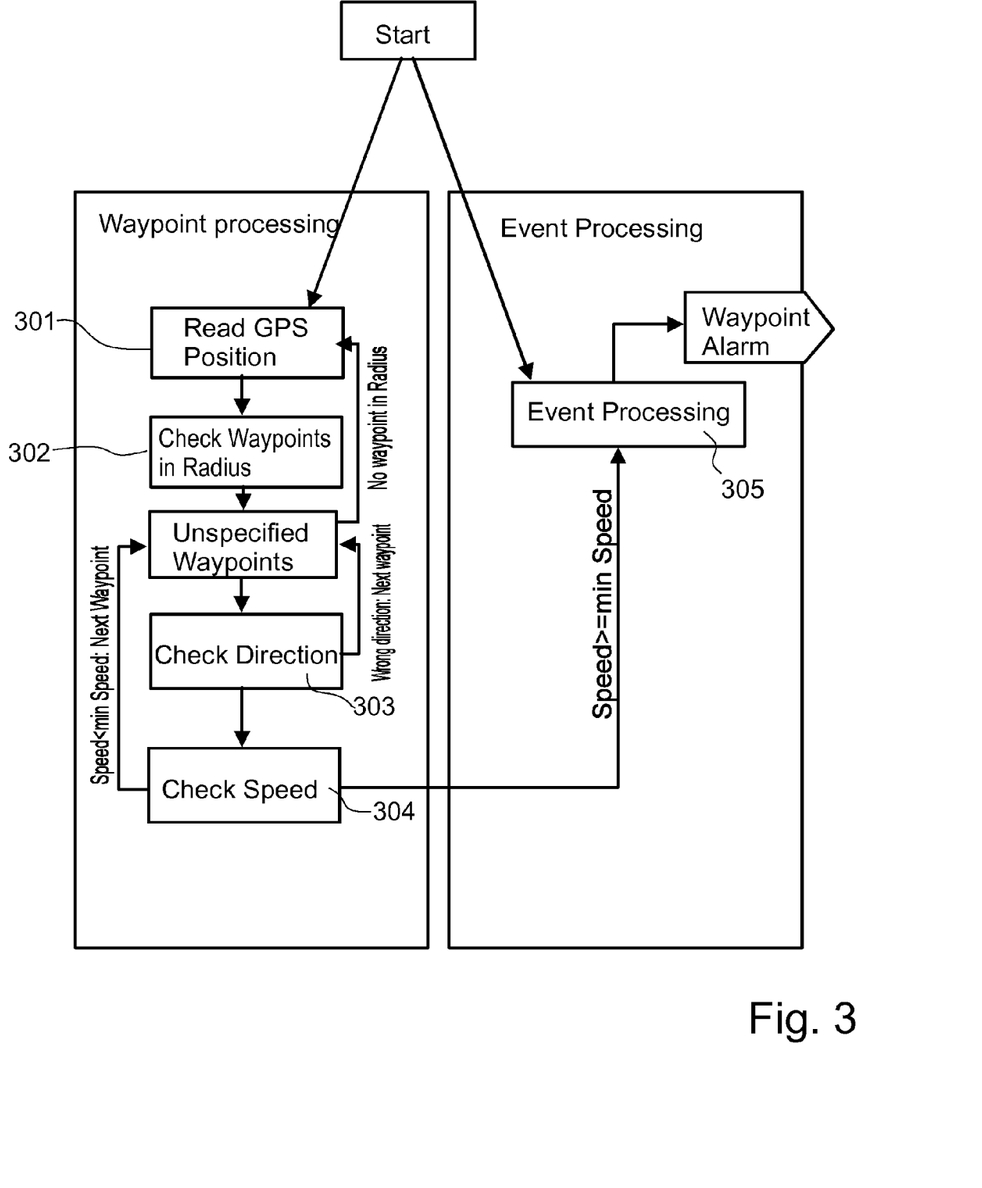
FIG. 3 is a flow diagram representative of the waypoint alarm activity algorithm implemented in the GPS module for determining the waypoint arrivals for the waypoints.

A more detailed illustration of the waypoint alarm activity algorithm implemented in the GPS module 27 determining the waypoint arrivals for the waypoints is illustrated in FIG. 3. The GPS module starts and it works in 2 parallel paths. The waypoint processing is illustrated on the left-hand side in FIG. 3 and the event processing is illustrated on the right-hand side in FIG. 3. In the waypoint processing, on each receipt of position data from the GPS receiver 19 in a step 301, a check is made in a step 302 if any waypoints are in a pre-configured search radius of the current position. The pre-configured search radius may be set depending on the position and/or depending on the monitoring task.

If there are any waypoints within the search radius, the direction variable stored in relation to each of them is checked match the direction of the vehicle in a step 303. If the direction is matched, the speed is checked in a step 304. When the speed is greater than or equal to the pre-configured value, the event processing path is invoked to raise a waypoint alarm in a step 305. The current position, details of the waypoint and the speed of travel are included as part of the alarm message. The subscriber to this alarm is control unit 18, which communicates to the sensor nodes 10 to perform data collection using the interface 26.

In embodiments where a radius specific to a waypoint is set, the latter should be set smaller than the search radius and the waypoint alarm should be triggered only when the distance to the waypoint is within both the search radius and the waypoint-specific radius. Once a waypoint alarm has been generated, the waypoint is marked as processed.

The radius avoids missing triggering at waypoints and it also makes the placement of waypoints much easier as the placement need not be 100% accurate. The receivers have inaccuracies due to GPS signal reflections and sometimes are slightly inaccurate.

The trigger radius the placement of a boundary around a waypoint. It can be used e.g. in case where the waypoint some meters away from the rail track and not directly on it. The user can specify that if the receiver is within 100 m or any other suitable distance of any waypoint it should trigger. It could also useful when the user wishes to trigger at very specific point on a track, perhaps for track quality assessment. This could be achieved by setting the radius to be smaller.

An alternative method of triggering measurements is facilitated by the system where a precise network time is specified for the measurement commencement time. The system application software monitors positional data which is constantly provided by the GPS module and estimates the time it will take to reach the waypoint location. At a time prior to reaching the waypoint the system application software issues a broadcast message over TCP/IP to the gateway manager(s) to instruct the nodes to trigger at a given network time in the future. When this time is reached each node performs a measurement, and the data is stored internally along with the time at which it was instructed to record the dataset.

In a further embodiment of the invention, the control unit 18 does not rely on predetermined indications in the map data but rather the control unit 18 evaluates on-line based on the route data whether a route section to follow is likely to meet predetermined criteria using the stored characteristics of the route sections of the route data. The control unit 18 then activates the condition monitoring units 10 when the vehicle is travelling in a route section with characteristics meeting the criterion and to deactivate the condition monitoring unit 10 in route sections not meeting predetermined criterion. The activation and deactivation may further be dependent on other parameters such as travelling speed, outside temperature and elapsed time since the last activation.

As already mentioned earlier, condition monitoring unit 10 for use in the condition monitoring system as described above includes a controller 14 configured to operate in an energy saving sleep mode and in an active mode. The controller 14 is configured to switch the condition monitoring unit 10 from the sleep mode to the active mode and from the active mode into the sleep mode based on signals received by the controller 14 via the transmitter 16 form the control unit 18. More specifically, the controller 14 is configured to switch the condition monitoring unit 10 from the sleep mode to the active mode upon receipt of a wake-up signal from a control unit 18 and to switch the condition monitoring unit 10 from the active mode into the sleep mode upon receipt of a sleep signal from the control unit 18.

The above system implements a method for monitoring a condition of a bearing unit for a vehicle using at least one condition monitoring unit 10 for measuring at least one operating parameter of one bearing unit and a control unit 18 for receiving and processing signals obtained from the condition monitoring unit 10, wherein a geographic position of the vehicle is detected and wherein the condition monitoring unit 10 activated and/or deactivated depending on the detected geographic position.

A further aspect of the invention relates to a method of triggering simultaneous measurements across multiple nodes at a given geographical location is desirable in order to discount the influence that track conditions may have on the measurements collected by sensors. In the case of long trains, the geographic location of the control unit 10 may substantially differ from the geographic location of a particular axle box. This helps ensuring that measurement quality remains consistent across all sensors. GPS coupled with a time synchronized sensor network can also be used to provide such a feature.

A further aspect of the invention relates to the use of the system as specified above for the purpose of measuring track quality as a tool for infrastructure monitoring.

When considering the example of a train presented above, waypoint co-ordinates are pre-logged in a database using a GUI trigger planner 22 application in the central control unit 18 as the central hub which manages the monitoring system operation.

A hardware GNSS receiver module receives GIS signals from multiple satellites 30 and converts the signals into NMEA formatted messages for the GPS module which continually provides application software with location information including longitude and latitude data which the PC application can use to determine the approximate distance (and time) to the target waypoint.

Upon reaching the location of the waypoint, the GPS module creates an exception message and determines that various parameters are met before proceeding further including ascertaining that the train is traveling within an acceptable speed band configured in the system and that the speed itself is not changing within a specified tolerance. If these conditions are accepted the system software proceeds to flag an exception and trigger a broadcast message to all nodes on the network. This transaction involves the transmission of a message over TCP/IP to all gateway managers on the network. Upon reception, each gateway manager forwards the broadcast message to the condition monitoring units 10 as the sensor nodes over wireless.

When each condition monitoring unit 10 receives the message, it instigates a data capture, powering on acquisition circuitry for a period before storing the recorded data and shutting the circuitry off. Data may be offloaded directly after the capture or at a later time. The node then re-enters a low power state until requested to perform another measurement or task by the central control unit 18.

In the case where manual measurements are requested, the system does not require GPS data. If the GPS is not being used, the default speed and null position values are used. In case of GPS availability, the speed and position are acquired from the GPS Module. Then a broadcast message is sent. Once the condition monitoring unit 10 receives the broadcast command message, it shall perform the necessary sampling according to the preconfigured setup and advised speed.

The application software in the control unit 18 maintains a dynamic table in the database to coordinate the data received as a response to the broadcast command. This is done to prevent data loss during power outages or connectivity issues. The dynamic data needs to be flushed at predetermined intervals.

As an optional feature, speed changes are constantly reported by the GPS module and if the speed changed event is handled the database is updated accordingly.

When the overall data is received, the date/time and speed are compared with the database and for any speed changes. If the speed has remained constant the sample is logged and the waveform is requested. If any speed changed value exceeding a threshold value is observed, the sample is rendered invalid and not stored in the database.

On reaching this waypoint, the condition monitoring units 10 are triggered to 'wake up' by the control unit 18 and begin operating. The process used by the trigger planner 22 to achieve this firstly determines a suitable waypoint location based on the speed, location and track conditions then inputting the waypoint parameter details into an on-train software running on the control unit 18. Depending on the data input by the trigger planner 22, there will be one or many periods of operation over the train's route.

Wireless sensor systems associated with monitoring wheel bearings normally have means of detecting rotational speed of the wheel and consequently have a degree of resilience to speed variations.

While sensor systems with wheel rotation detection may not require velocity information on straight lengths of track, embodiments using condition monitoring units 10 without rotation detection may benefit from GPS generated data for speed calculations. A simple solution only requires start and end points either coupled with time data from the GPS system, or using the wireless sensor system clock, but system lag from GPS can cause issues especially when acceleration information is required.

In further embodiments of the invention the condition monitoring system may include an INS (Inertial Navigation System). Further, it is possible to equip the condition monitoring units 10 with a 3 or 6 axes accelerometer or gyroscope and to use the data measured by these devices in processing the waveforms and/or in judging the reliability of the data. This would enable improved control of the sensor system and assist with data processing by providing additional environmental information by enabling incorporation of some track related variation in addition to accurate acceleration measurements.

Taking such factors into consideration assists in maintaining consistency of the conditions under which monitoring is conducted. It could also prove useful when monitoring on curved sections of track by providing angular acceleration and velocity readings. After all, these same principals of operation would apply not simply for a straight piece of track, but for any section of track the train travels over and, for example, monitoring bearings under maximum load can provide useful information.

The invention claimed is:

1. A condition monitoring system for bearing units for vehicles, the system comprising:
   at least one condition monitoring unit for measuring at least one operating parameter of one bearing unit;
   a control unit for receiving and processing signals obtained from the condition monitoring unit;
   a trigger planner for setting trigger points for activating and deactivating the at least one condition monitoring unit; and
   a circuit for detecting a geographic position of the vehicle,
   wherein the condition monitoring unit is activated and deactivated depending on the geographic position and a travelling direction of the vehicles with respect to the trigger points.

2. The condition monitoring system according to claim 1, the control unit further comprising a memory for storing route data of the vehicle, the route data including a plurality of possible route sections along which the vehicle can travel,
   wherein the control unit is configured to activate the condition monitoring unit when the vehicle is travelling in one route section out of a predetermined set of route sections and to deactivate the condition monitoring unit in route sections not included in the predetermined set of route sections.

3. The condition monitoring system according claim 1, the control unit further comprising a memory for storing route data of the vehicle, the route data including a plurality of possible route sections along which the vehicle can travel,
   wherein the control unit is configured to evaluate at least one characteristic of the route sections of the route data and to activate the condition monitoring unit when the vehicle is travelling in a route section with characteristics meeting at least one predetermined criterion and to deactivate the condition monitoring unit in route sections not meeting the at least one predetermined criterion.

4. The condition monitoring system according to claim 1, the control unit further comprising a memory for storing at least one radius and coordinates of a plurality of trigger points,
   wherein the control unit is configured to at least one of activate and deactivate the condition monitoring unit when the distance between at least one of the plurality of trigger points and the geographic position is smaller than the radius.

5. The condition monitoring system according to claim 1, wherein the memory is configured to store a travelling direction in relation with at least one of a plurality of trigger points, wherein control unit is configured to activate and/or deactivate the condition monitoring unit when the distance between at least one of the plurality of trigger points and the geographic position is smaller than the radius and when further the travelling direction of the vehicle matches the travelling direction stored in relation to said at least one waypoint.

6. The condition monitoring system according to claim 1, the circuit for detecting the geographic position includes a circuit for receiving signals of satellites of a global positioning system.

7. The condition monitoring system according to claim 1, wherein the condition monitoring unit is configured to communicate with the control unit in a wireless way.

8. The condition monitoring system according to claim 1, wherein the circuit for detecting a geographic position is part of the condition monitoring unit attached to the bearing unit.

9. The condition monitoring system according to claim 1, wherein the circuit for detecting a geographic position is part of the control unit of the vehicle.

10. The condition monitoring system according to claim 1, wherein the condition monitoring unit is configured to be attached to a hub unit of a train,
    wherein the control unit is configured to monitor the condition of a plurality of hub units of the train.

11. The condition monitoring system according to claim 1, wherein the control unit is configured to trigger simultaneous measurements across multiple condition monitoring units at a given geographical location.

12. The condition monitoring system according to claim 1, wherein the control unit is configured to use the data collected by the condition monitoring units for the purpose of measuring track quality as a tool for infrastructure monitoring.

13. The condition monitoring system according to claim 1, wherein the trigger planer activates and deactivates the condition monitoring unit based on a data structure comprising the geographic position, the travelling direction, upper and lower speed limits, and a radius.

14. The condition monitoring system according to claim 1, wherein the trigger planer activates an alarm when the vehicles pass in one of two possible directions on a track and when a speed of the vehicles is in within a range suitable for obtaining measurements of high quality.

15. At least one condition monitoring unit comprising:
    a controller configured to operate in an energy saving sleep mode and in an active mode,
    wherein the controller comprises a trigger planner for setting trigger points for activating and deactivating the at least one condition monitoring unit,
    wherein at least some of the parameters being monitored in the active mode are not monitored in the sleep mode,
    wherein the controller is configured to switch the at least one condition monitoring unit from the sleep mode to the active mode and from the active mode into the sleep mode based on one or more signals received by the controller from a control unit of a condition monitoring system operating within a vehicle,
    wherein the condition monitoring unit is activated and deactivated depending on a detected geographic position and a travelling direction of the vehicles with respect to the trigger points.

16. The at least one condition monitoring unit according to claim 15, wherein the controller is configured to switch the at least one condition monitoring unit from the sleep mode to the active mode upon receipt of a wake-up signal of the one or more signals from the control unit and to switch the at least one condition monitoring unit from the active mode into the sleep mode upon receipt of a sleep signal of the one or more signals from the control unit.

17. A method for monitoring a condition of a bearing unit for a vehicle comprising at least one condition monitoring unit for measuring at least one operating parameter of one bearing unit, a trigger planner for setting trigger points for activating and deactivating the at least one condition monitoring unit, and a control unit for receiving and processing signals obtained from the condition monitoring unit,
    the method comprising:
    detecting a geographic position and a travelling direction of the vehicle; and
    activating and deactivating the condition monitoring unit in accordance with the geographic position and the travelling direction with respect to the trigger points.

* * * * *